US008464635B1

(12) United States Patent
Sprinkle et al.

(10) Patent No.: US 8,464,635 B1
(45) Date of Patent: Jun. 18, 2013

(54) FRYING SYSTEM (75) Inventors: Robert Jeffrey Sprinkle, Suwanee, GA (US); Jason M. Jeong, Duluth, GA (US); Donald A. Mather, Sandusky, OH (US); Mark W. Taylor, Fayetteville, AR (US); Steven M. Harrington, Cardiff by the Sea, CA (US)

(73) Assignee: Alkar-RapidPak-MP Equipment, Inc., Lodi, WI (US)

( * ) Notice: Subject to any disclaimer, the term of this patent is extended or adjusted under 35 U.S.C. 154(b) by 1018 days.

(21) Appl. No.: 12/015,657

(22) Filed: Jan. 17, 2008

(51) Int. Cl.
*A47J 37/12* (2006.01)

(52) U.S. Cl.
USPC .................. 99/404; 99/403; 99/405

(58) Field of Classification Search
USPC .......... 165/175, 178, 108, 177, 109.1; 138/38
See application file for complete search history.

(56) References Cited

U.S. PATENT DOCUMENTS

| | | | |
|---|---|---|---|
| 400,443 A | 4/1889 | Cooper | |
| 1,234,131 A | 7/1917 | Cleveland | |
| 1,630,309 A | 5/1927 | Pitman | |
| 1,686,596 A | 10/1928 | Betz | |
| 1,760,979 A | 6/1930 | Ferry | |
| 1,919,185 A | 7/1933 | Chapman | |
| 2,124,186 A | 7/1938 | Childs | |
| 2,147,335 A | 2/1939 | De Fazi | |
| 2,182,735 A | 12/1939 | O'Dowd | |
| 2,431,753 A | 12/1947 | Holderle et al. | |
| 2,535,905 A | 12/1950 | Dawson | |
| 2,543,835 A | 3/1951 | Dewey | |
| 2,546,163 A | 3/1951 | McBeth | |
| 2,552,441 A | 5/1951 | McBeth | |
| 2,652,767 A | 9/1953 | Childs | |
| 2,655,944 A * | 10/1953 | Proehl | 138/38 |
| 2,666,427 A * | 1/1954 | Keating | 126/391.1 |
| 2,712,308 A | 7/1955 | Keating | |
| 2,716,938 A | 9/1955 | Smith | |
| 2,833,203 A | 5/1958 | Benson et al. | |
| 2,852,042 A | 9/1958 | Lynn | |

(Continued)

FOREIGN PATENT DOCUMENTS

CA 562618 9/1958
EP 0 064 407 B1 6/1985

(Continued)

*Primary Examiner* — Gene Kim
*Assistant Examiner* — John E Simms, Jr.
(74) *Attorney, Agent, or Firm* — Andrus, Sceales, Starke & Sawall, LLP (57) ABSTRACT

A frying system for frying a food product is disclosed having an endless conveyor system for cooking product in a bath of hot cooking oil. The endless conveyor system includes a submerging conveyor, a main conveyor, and a sediment conveyor, permanently, successively linked to one another. The endless conveyor system is also permanently linked to a hood portion of the housing. The sediment conveyor includes a heat exchanger constantly connected thereto for heating the bath of hot cooking oil. The heat exchanger includes a plurality of elongated elliptical shaped conduits and further may include a baffle that may operate as an elongated fluid flow optimization member to re-direct the flow of fluid. The hood portion of the housing of the frying system is capable of being raised and lowered from a closed, operative position to an open, inoperative position, and to intermediate positions therebetween. Since the components of the conveyor system are permanently successively linked together and to hood, as the hood is raised, the components of the conveyor system may be removed from the bath or, alternatively, may remain in the bath while other portions are removed.

25 Claims, 7 Drawing Sheets

U.S. PATENT DOCUMENTS

| | | | |
|---|---|---|---|
| 2,864,405 A * | 12/1958 | Young | 138/38 |
| 3,132,949 A | 5/1964 | Crowe | |
| 3,203,341 A | 8/1965 | Hedgepeth | |
| 3,263,596 A | 8/1966 | Thomas | |
| 3,282,197 A | 11/1966 | Smith, Jr. | |
| 3,292,769 A | 12/1966 | Zuppiger | |
| 3,309,981 A | 3/1967 | Benson et al. | |
| 3,313,288 A | 4/1967 | Aho | |
| 3,376,806 A * | 4/1968 | Magnusson | 99/408 |
| 3,438,434 A * | 4/1969 | Smith | 165/158 |
| 3,458,917 A | 8/1969 | Mueller | |
| 3,472,155 A | 10/1969 | Caridis et al. | |
| 3,497,936 A | 3/1970 | Donaldson | |
| 3,576,647 A | 4/1971 | Liepa | |
| 3,585,923 A | 6/1971 | Waller | |
| 3,603,101 A | 9/1971 | Sullivan | |
| 3,612,036 A * | 10/1971 | Kaufman | 126/390.1 |
| 3,635,149 A | 1/1972 | Smith et al. | |
| 3,757,672 A * | 9/1973 | Szabrak et al. | 99/404 |
| 3,769,959 A | 11/1973 | Parker | |
| 3,822,742 A | 7/1974 | Stowell | |
| 3,911,843 A | 10/1975 | Stowell | |
| 3,947,241 A | 3/1976 | Caridis et al. | |
| 4,002,200 A | 1/1977 | Raskin | |
| 4,020,189 A * | 4/1977 | Wright et al. | 426/438 |
| 4,026,804 A | 5/1977 | Keating | |
| 4,081,375 A | 3/1978 | Deal et al. | |
| 4,106,558 A * | 8/1978 | Neveux | 165/109.1 |
| 4,167,585 A | 9/1979 | Caridis et al. | |
| 4,228,730 A | 10/1980 | Schindler et al. | |
| 4,269,265 A * | 5/1981 | Meyer et al. | 165/109.1 |
| 4,289,111 A | 9/1981 | Duncan et al. | |
| 4,357,862 A * | 11/1982 | Anstett et al. | 99/355 |
| 4,369,837 A * | 1/1983 | Moranne | 165/175 |
| 4,412,558 A * | 11/1983 | Burke et al. | 138/38 |
| 4,458,749 A | 7/1984 | Melnyk | |
| 4,465,129 A | 8/1984 | Baldensperger et al. | |
| 4,466,479 A | 8/1984 | MacLean | |
| 4,481,873 A | 11/1984 | Keating | |
| 4,484,623 A | 11/1984 | Rowe et al. | |
| 4,488,478 A | 12/1984 | Leeper | |
| 4,513,811 A | 4/1985 | Lesniak | |
| 4,577,681 A * | 3/1986 | Hughes | 165/109.1 |
| 4,660,542 A | 4/1987 | Scherer | |
| 4,678,027 A | 7/1987 | Shirey et al. | |
| 4,694,743 A | 9/1987 | Groff | |
| 4,727,907 A * | 3/1988 | Duncan | 138/38 |
| 4,730,669 A | 3/1988 | Beasley et al. | |
| 4,744,293 A | 5/1988 | Shimokawa | |
| 4,823,865 A * | 4/1989 | Hughes | 165/109.1 |
| 4,848,317 A | 7/1989 | Prudhomme et al. | |
| 4,852,475 A * | 8/1989 | Yang | 99/404 |
| 4,882,984 A | 11/1989 | Eves, II | |
| 4,895,137 A | 1/1990 | Jones et al. | |
| 4,898,151 A | 2/1990 | Luebke et al. | |
| 4,913,041 A | 4/1990 | Taber et al. | |
| 4,913,042 A | 4/1990 | Miller | |
| 4,922,435 A * | 5/1990 | Cahlander et al. | 700/247 |
| 5,050,582 A | 9/1991 | Almond et al. | |
| 5,067,235 A | 11/1991 | Kato et al. | |
| 5,074,199 A * | 12/1991 | Miller | 99/404 |
| 5,094,224 A | 3/1992 | Diesch | |
| 5,101,806 A | 4/1992 | Hunt et al. | |
| 5,138,765 A | 8/1992 | Watson et al. | |
| 5,253,567 A * | 10/1993 | Gunawardena | 99/404 |
| 5,287,918 A | 2/1994 | Banks et al. | |
| 5,385,204 A | 1/1995 | Boardman et al. | |
| 5,476,034 A | 12/1995 | Lygum | |
| 5,505,256 A | 4/1996 | Boardman et al. | |
| 5,632,197 A | 5/1997 | Lubawy et al. | |
| 5,778,871 A | 7/1998 | Herring | |
| 5,901,784 A * | 5/1999 | Potier | 165/173 |
| 6,067,899 A * | 5/2000 | Caridis et al. | 99/404 |
| RE37,009 E * | 1/2001 | Diesch | 126/391.1 |
| 6,305,274 B1 * | 10/2001 | Nothum et al. | 99/404 |
| 6,745,671 B2 * | 6/2004 | Kuenen | 99/349 |
| 6,808,545 B1 * | 10/2004 | Shuler, Sr. | 55/385.1 |
| 6,962,193 B2 * | 11/2005 | Liu et al. | 165/109.1 |
| 7,069,841 B2 * | 7/2006 | Ledet et al. | 99/386 |
| 7,246,436 B2 | 7/2007 | Blomgren et al. | |
| 7,549,465 B2 * | 6/2009 | Gong et al. | 165/173 |
| 7,624,676 B2 * | 12/2009 | Nishida et al. | 99/403 |
| 7,699,051 B2 * | 4/2010 | Gagas et al. | 126/299 D |
| 7,775,053 B2 * | 8/2010 | Joe et al. | 60/806 |
| 2007/0138160 A1 * | 6/2007 | Ando et al. | 219/401 |
| 2010/0247726 A1 * | 9/2010 | van der Eerden et al. | 426/438 |

FOREIGN PATENT DOCUMENTS

| | | |
|---|---|---|
| EP | 0 125 750 | 1/1991 |
| EP | 0 903 084 A2 | 3/1999 |
| EP | 1729065 A1 * | 12/2006 |
| GB | 639895 | 7/1950 |
| GB | 760393 | 10/1956 |
| GB | 767255 | 1/1957 |
| IE | 960202 | 10/1996 |
| WO | WO-91/03973 | 4/1991 |

* cited by examiner

FRYING SYSTEM

BACKGROUND AND SUMMARY

The present application generally relates to hot fluid fryers for the continuous hot fluid frying of large quantities of food products, particularly for large scale food process lines. More specifically, the application is directed to a frying system having a housing with a tank portion that holds a bath of cooking oil with an endless conveyor system attached to the housing for conveying a food product through heated cooking fluid, such as oil or the like.

Frying systems have evolved significantly over the past 30 years. The need to process greater volumes of food product has caused the size of frying systems to increase. Some frying systems now measure 30 feet in length and 60 inches in width. Of course, a larger frying system means larger volumes of cooking oil are necessary to operate these systems. However, oil prices have also increased over time, thus oil used in frying systems is increasingly expensive. For example, a 30 foot by 60 inch frying system requires 93 gallons of oil per inch of tank height. Accordingly, modern frying systems must not only meet today's high-volume processing demands, but must also meet today's low oil volume requirements.

The frying system of the present application includes a housing having a tank portion for holding the bath of hot cooking fluid. The housing may also include a hood portion located in a plane above the tank portion and covering the tank portion when in use. An endless conveyor system may be attached to the housing, the conveyor system comprising a submerging conveyor, a main conveyor and a sediment conveyor. The conveyor system is adapted to carry product portions on an upper run of the main conveyor from an in-feed end of the housing to a discharge end of the housing. The submerging conveyor is arranged above the main conveyor and operates to hold the product on the upper run of the main conveyor. The main conveyor and submerging conveyor operate together to pass product through the bath of hot cooking fluid when in use. The runs of the submerging conveyor and the main conveyor through the bath of hot cooking fluid define a cook zone where the product is cooked. The sediment conveyor is located below the main conveyor and operates to remove debris from the bottom portion of the tank. A drive system operates to drive the conveyor system to accomplish the functions described above.

A heat exchanger is continuously connected to the frame of the sediment conveyor. The heat exchanger is operable to heat the bath of cooking fluid, such as oil or the like, and is, therefore, adapted for submergence into the bath. The heat exchanger of the present application includes a plurality of elliptical shaped heating conduits, each conduit having an inlet end attached to an inlet manifold and an outlet end attached to an outlet manifold for circulating heated fluid through the heat exchanger to accomplish heating of the hot cooking fluid bath. The plurality of elliptical shaped heating conduits are arranged horizontally across the tank portion of the housing and may be mounted in the direction of product flow. Each of the plurality of elliptical shaped conduits comprise a baffle. The baffle may operate as a fluid flow optimization member for redirecting the flow of fluid. The redirection of heating fluid may be in a helical path. The baffles comprise an elongated insert running longitudinally through the elliptical shaped conduit channel. In some embodiments, the baffles bisect the conduit channel. In one embodiment, the baffle comprises a plurality of orifices and a plurality of vanes. The orifices may be turbulence inducing orifices. The orifices and vanes, either together or separably, operate to create an internal swept surface heat transfer condition within the conduit channel. The conveyor system and heat exchanger together provide a low-profile design, minimizing the amount of cooking oil necessary for use.

The frying system of the present application also includes a power source co-acting with the housing for lifting the hood portion of the housing upwardly. The hood portion, the submerging conveyor, the main conveyor and the sediment conveyor are successively coupled such that when the power source is activated to lift the hood portion of the housing, the conveyor system can also be moved upwardly to an inoperative position above the bath. Specifically, when the hood portion of the housing is raised upwardly, the linkage between the hood portion and the submerging conveyor, the linkage between the submerging conveyor and the main conveyor, and the linkage between the main conveyor and the sediment conveyor will cause the consecutive elements of the conveyor system to be successively extracted from the bath. The power source operates such that the conveyor system may be partially removed from the bath, wherein the submerging conveyor and main conveyor are removed from the bath, while the sediment conveyor remains in the bath.

A PLC control may be used, in some embodiments, to provide control of the bath temperature, control of filtration, activation of the power source to raise and lower the hood and conveyor system, continuous monitoring of oil levels, dual zone temperature control of the bath and/or real time data feedback.

DETAILED DESCRIPTION

Figure 1:
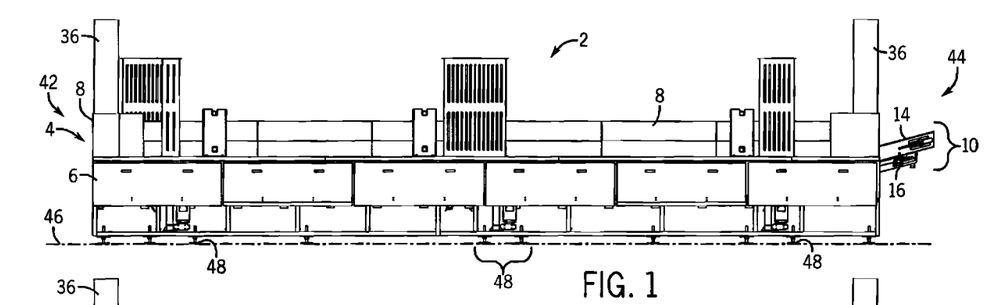
FIG. 1 is a side view of the frying system in operative position.
Figure 2:
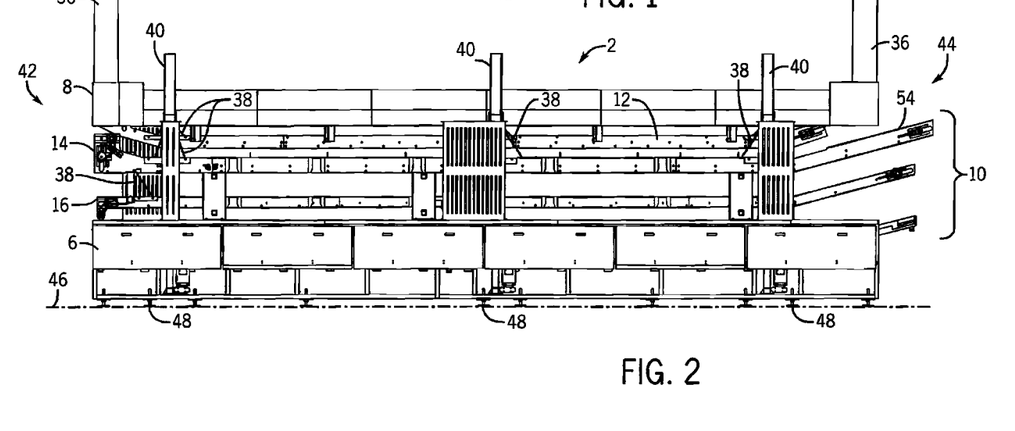
FIG. 2 is a side view of the frying system in an inoperative position with the conveyor system extracted from the bath.

Referring first to FIGS. 1 and 2, a frying system 2 of the present application has a housing 4 that includes a tank portion 6 and a hood portion 8. The tank portion 6 of the housing 4 is adapted to hold a bath of hot cooking fluid, such as oil or the like. The housing 4 is supported on a supporting surface 46 by a plurality of support feet 48. Support feet 48 are adjustable such that the housing 4 can be arranged in a plane substantially parallel to support surface 46. In one embodiment, such adjustability is accomplished by using a nut 50, or similar adjustable securing means, to adjust a lower portion of the housing 52 relative to a support foot 48 and, therefore, also relative to supporting surface 46.

The housing assembly 4, within lower portion 52, may comprise thermal expansion straps to restrict the lateral (width-wise) expansion of the tank portion 6. This prevents warping of the tank portion 6 such that the conveyor system 10 does not bind to the walls of the tank 6 during thermal expansion/contraction of the system. The expansion straps transfer thermal expansion and contraction from the tank portion 6 to the lower portion 52 of the housing assembly 4 where voids exist to allow expansion and contraction of the straps within accepted tolerances. The thermal expansion straps replace well known support rods that extend laterally across the tank portion, but are known to interfere with conveyor operation and also been known to crack under thermal expansion and contraction stresses.

Figure 3:
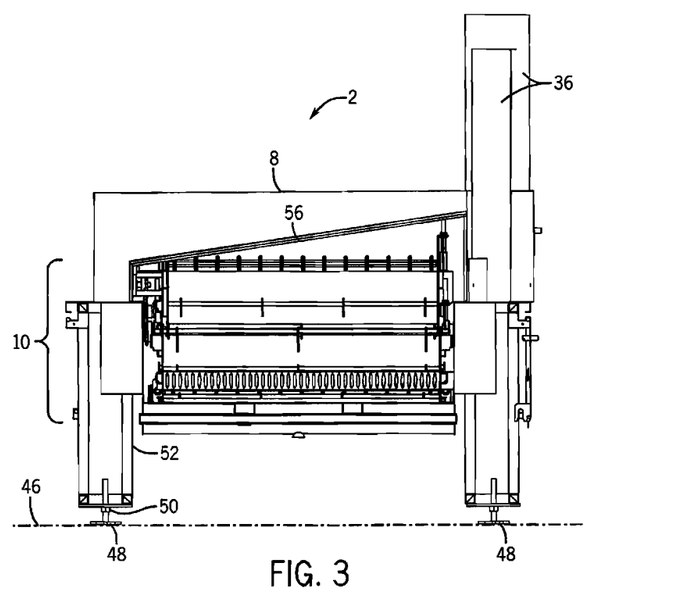
FIG. 3 is a back view of the frying system in operative position.

A hood portion 8 of the housing 4 is situated above the tank portion 6 of the housing 4, and covers the tank portion 6. The hood portion 8 is operatively connected with a power source, as is well known in the art, for raising and lowering the hood 8 relative to the tank portion 4 as demonstrated in the comparison between FIGS. 1 and 2, and also in comparison between FIGS. 3 and 4. In one embodiment, the power source comprises a plurality of vertically movable members 40, that are, in one embodiment, electronic linear actuators. Alternatively, the vertically variable members may be hydraulic jacks, as well known in the art, or a functional equivalent. The plurality of vertically movable members 40 are connected to the hood portion 8 and operate to lift the hood 8 to a position spaced above the tank 4. In one embodiment, the vertically movable members include vertically extending piston rods connected to the hood. The electronic linear actuators 40 operate to raise and lower the hood 8 vertically to a position spaced above the conveyor system 10 when the conveyor system 10 is in the inoperative position. The lifting of the hood 8 to provide selective access to components of the endless conveyor system 10 allows for easy access to all components of the endless conveyor system 10, including any components fixedly attached to the conveyor system 10, for example, a heat exchanger assembly 18 fixedly attached to the sediment conveyor 16.

Attached to the housing 4 is the endless conveyor system 10. The endless conveyor system 10 comprises a submerging conveyor 12, a main conveyor 14, and a sediment conveyor 16. The conveyor system 10 is adapted, in an operative position, to carry a product on an upper run 54 of main conveyor 14 from an in feed end 42 of the housing 4 to a discharge end 44 of the housing 4. The product may be any product that a user may desire to fry cook, including, but not limited to, chicken portions, seafood such as shrimp, oysters, fish nuggets or the like, onion rings, cheese, vegetables, fritters, beef, pork or any other food that may be desired to be fry cooked.

The submerging conveyor 12 operates in conjunction with the main conveyor 14 to pass the product through the bath of hot cooking oil or the like. The upper run 54 of the main conveyor 14 operates in proximity with a bottom run of submerging conveyor 12 to limit product movement while the product passes through the bath. The upper run 54 of the main conveyor 14, as it passes through the cooking fluid, defines a cook zone of the flying system 2. The clearance between the main conveyor 14 and the submerging conveyor 12 can be adjusted to accommodate food products of different heights.

Figure 5:
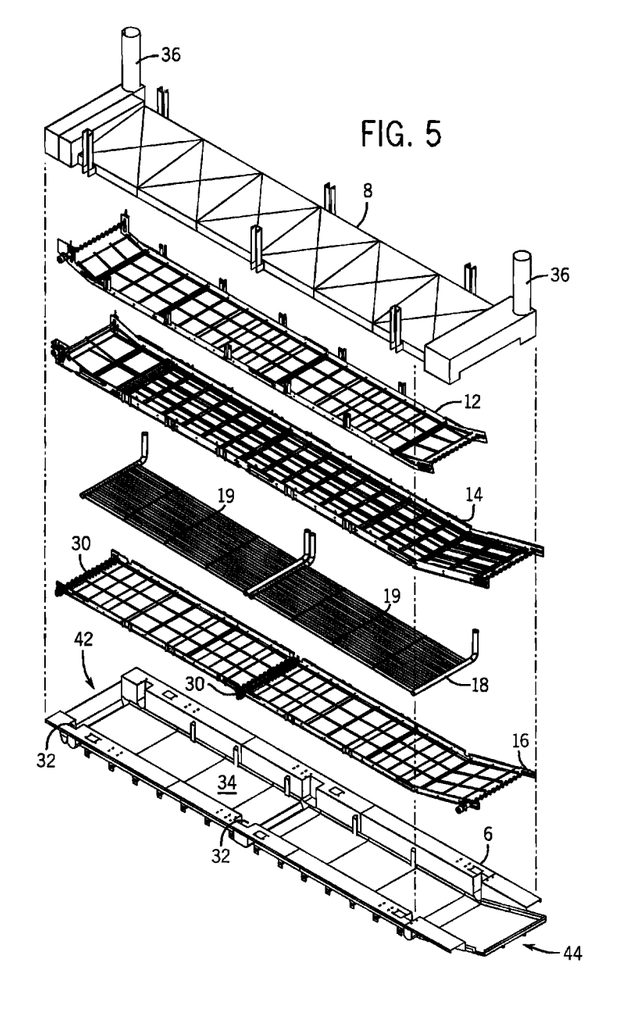
FIG. 5 is an exploded view of the hood portion of the housing, the tank portion of the housing, the conveyor system and the heat exchanger.

The sediment conveyor 16 operates to remove debris from the bottom portion of the tank 6. Removal of debris is essential to prolong the life of the cooking oil. Referring now to FIG. 5, the sediment conveyor 16 includes sediment removal augers 30. When the sediment conveyor 16 is lowered into the tank portion 6 of the housing 4, the sediment removal augers 30 align with sediment removal ports 32 of the tank portion 6. The frying system 2 of the present application includes at least one sediment removal auger 30, and in one embodiment, demonstrated in FIG. 5, two sediment removal augers 30 are used. The sediment conveyor is driven from the top, eliminating the requirement of access holes in the tank 6. Moreover, since sediment removal augers 30 are integral to the sediment conveyor 16, access holes for inserting and removing sediment removal augers 30 are eliminated from the tank 6. The sediment removal ports 32 of the tank portion 6 include access such that a user can remove sediment from the ports 32 without raising the hood 8 into an inoperative position. In one embodiment, the sediment removal ports 32 have a substantially cylindrical configuration. This substantially cylindrical configuration allows the ports 32 to act as thermal expansion ports for the bottom surface 34. However, as recognized by those of skill in the art, the sediment removal ports 32 may have other configurations and still allow for sediment removal and thermal expansion.

The substantially cylindrical configuration of the sediment removal ports 32 is advantageous over conventional, rectangular, flat-bottomed sediment removal ports. The substantially cylindrical ports of the present application do not have the additional welds necessary to construct conventional rectangular ports, and therefore endure thermal expansion and contraction stresses in a much more durable manner. The sediment removal ports 32 are the only holes or cut-outs present in the tank portion 6. The absence of additional holes or cut-outs (e.g., maintenance openings, inspection openings or shaft bearing mounting points) prevents leaks that commonly occur at these openings, primarily due to the constant thermal expansion and contraction of the tank portion. The radial configuration also allows sediment to collect at the bottommost portion of the port, and prevents sediment from getting caught in rectangular corners, making sediment removal by the sediment augers 30 more efficient.

The sediment conveyor 16 may also include a sediment removal belt that drags across a bottom surface 34 of tank 6 to move sediment toward augers 30 and removal ports 32. In one embodiment, the bottom surface 34 of the tank 6 is sloped to aid in removal of sediment from the bottom surface 34 into sediment removal ports 32. In another embodiment, the bottom surface 34 comprises a two-section bottom surface 34 having one sediment removal port 32 at the in-feed end 42 and another sediment removal port 32' centrally located on the bottom surface, as shown in FIG. 5. In this embodiment, the bottom surface 34 slopes upwardly from the sediment removal port 32 at the in-feed end 42 to the sediment removal port 32' at the central location; the bottom surface then begins another upward slope from the centrally located sediment removal portion 32' to the discharge end 44 of the bottom surface 34. Alternatively, the two slope configuration may slope upwardly from a sediment removal port 32 at a discharge end 44 to the central sediment removal port 32 and then upwardly again from central sediment removal port 32' to the in-feed end 42. This two slope configuration reduces the overall slope of the bottom surface 34 by half the overall height, compared to conventional systems with a single slope from discharge to in-feed, reducing the oil volume required to operate the system. In one embodiment, the sediment conveyor 16 is operable to run at a slower speed than submerging conveyor 12 and main conveyor 14 in order to prevent disruption and dispersal of sediment through the cooking oil.

The endless conveyor system 10 is operatively connected to a drive system for driving the motion of the components of the conveyor system 10. Such drive systems are well known in the art. In one embodiment, the drive system comprises hydraulic motors to drive the conveyors. However, the motors may be other types of motors as are well known in the art. In another embodiment, three hydraulic motors are used, one for each conveyor system component (i.e. submerging conveyor 12, main conveyor 14 and sediment conveyor 16), thus each component of the conveyor system 10 may be operated at separate speeds. In one embodiment, the submerging conveyor 12 and the main conveyor 14 are operated at the same speed, while the sediment conveyor 16 is operated at a slower speed. Generally, the speed for the various conveyor system components is determined on a product-by-product basis. In one embodiment, the motors drive a sprocket connected to a chain which, in turn, drives the movement of the conveyor system components. In another embodiment, the sediment removal augers 30 are driven by a similar motor/sprocket/chain drive configuration. Conveyor speeds, when hydraulic motors are used, are controlled by a hydraulic manifold connected to the system's Programmable Logic Controller (PLC). The PLC may also receive speed feedback from a sensor on each motor. The PLC controls solenoid valves on the hydraulic manifold to operate the hydraulic motors.

Figure 4:
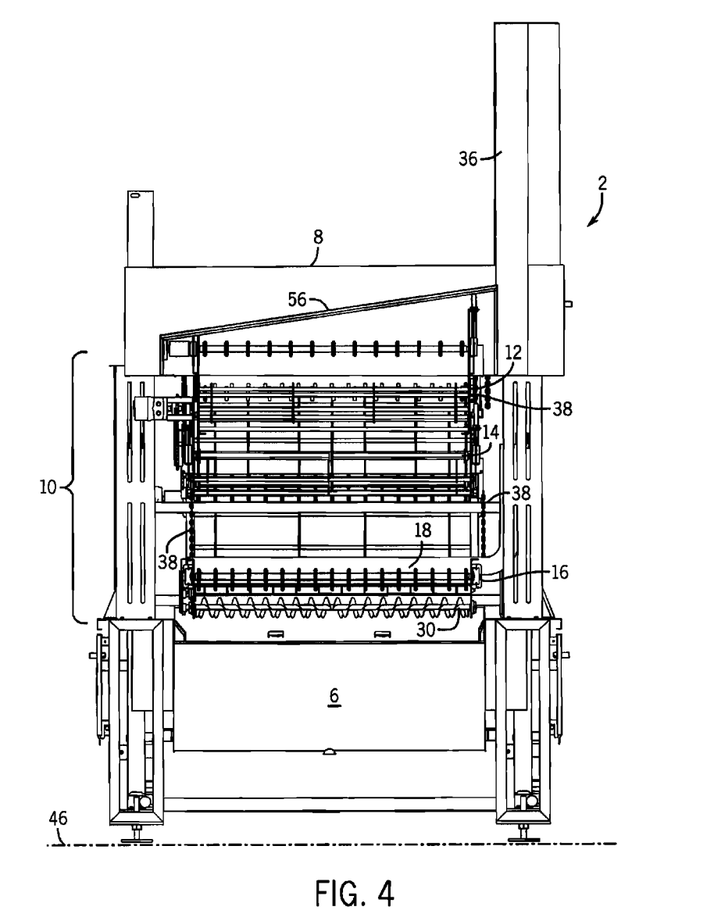
FIG. 4 is a back view of the frying system in an inoperative position with the conveyor system extracted from the bath.

Turning now to FIGS. 2 and 4, therein is shown that the components of the endless conveyor system 10 are permanently and successively coupled to one another. Specifically, the submerging conveyor 12 is coupled to the main conveyor 14, and the main conveyor 14 is coupled to the sediment conveyor 16. This coupling is accomplished through flexible suspension members 38. In one embodiment, the flexible suspension members 38 are chains permanently linking the components of the endless conveyor system 10 together. However, the flexible suspension members 38 may be constructed of any material that provides enough strength to permanently link components of the endless conveyor system 10 together and to allow the raising and lowering of the conveyor system 10 into and out of the cooking oil bath, as will be further discussed herein. Removal of the sediment conveyor 16 from the cooking oil both adds convenience for service, including, but not limited to sanitation purposes, safety inspections and maintenance.

The endless conveyor system 10 is also permanently coupled to the hood portion 8 of the housing 4 via flexible suspension members 38 of the type described above. When the hood 8 is raised from the operative position shown in FIGS. 1 and 3 to the inoperative position shown in FIGS. 2 and 4, the endless conveyor system 10 is successively raised with the hood 8 because of the permanent successive coupling between the hood 8 and the components of the conveyor system 10. In one embodiment, the hood 8 is permanently linked to submerging conveyor 12. The power source, including electronic linear actuators 40, that operate to raise and lower the hood portion 8, are capable, in one embodiment, to raise the hood portion 8 to various locations between the upper position shown in FIGS. 1 and 3 to the inoperative position shown in FIGS. 2 and 4. In this manner, portions of the conveyor system 10 may remain in the bath, while other portions are removed from the bath. For example, hood 8 may be raised via vertically movable members 40 to an intermediate position between the operative position shown in FIG. 1 and the inoperative position shown in FIG. 2 such that the submerging conveyor 12 and main conveyor 14 are removed from the hot oil bath, while the sediment conveyor 16 remains in the bath. The degree to which the components of the conveyor system are separated from one another when in the inoperative position with the hood 8 raised, is dependent on the length of flexible suspension members 38. Additionally in one embodiment, the vertically moveable members 40 may operate with simultaneous, dependent movement through a consecutive relay and feedback arrangement. Thus, upward and downward movement is in unison, and instances of bending, cracking or breaking the hood are virtually eliminated.

In one embodiment, the inner surface 56 of the hood 8 is angled. This updraft angle creates an even exhaust flow across the cook zone and also creates a positive draft when the hood 8 is lifted upwardly towards the inoperative position. In one embodiment, the hood portion 8 includes at least one exhaust stack 36. In another embodiment, the hood portion 8 includes two offset exhaust stacks 36. The exhaust stacks are operable to remove exhaust from the cooking operation from the cook zone. The ability of the exhaust stack 36 to remove exhaust from the cooking zone minimizes air flow over the oil bath, increasing oil longevity. In one embodiment, the system includes a separate drain outside the cook zone to collect exhaust condensation and debris. This prevents exhaust condensation and debris from entering the cooking oil, prolonging the life of the cooking oil. The exhaust drain in this embodiment remains connected when the hood portion 8 is raised for continuous vapor collection and exhaust venting of the cooking zone.

The drive system for driving the endless conveyor system 10 and the power source for raising and lowering the hood 8 are, in one embodiment, controlled by a programmable logic control (PLC). The PLC is further operable to control the hot cooking oil bath temperature and the filtration of the bath and exhaust. In another embodiment, the PLC provides continuous monitoring of oil levels, dual zone temperature control of the bath and real time data feedback from the cooking process. The PLC control is capable of providing temperature linked activation of the power source to raise and lower hood 8 and conveyor system 10. The PLC may also provide safety system applications, such as safety interlock temperature controls that prevent removal of heat exchanger 18 from a bath before heat exchanger 18 has cooled to a safe temperature. The PLC control also may provide the ability of a user to control the oil heat inside the fryer system 2 from front to back and side to side. An acceptable PLC control is an Allen Bradley PLC control available from Rockwell Automation of Milwaukee, Wis.

The frying system 2 of the present application includes a heat exchanger 18 for heating the bath of hot cooking oil or the like. The heat exchanger 18 is constantly connected to the sediment conveyor 16. In one embodiment, the heat exchanger 18 is constantly connected to the top surface of the sediment conveyor 16 to allow for independent thermal expansion of both the sediment conveyor 16 and heat exchanger 18. In another embodiment, heat exchanger 18 rests on top of the sediment conveyor 16 such that movement of the heat exchanger 18 is dependent on the movement of sediment conveyor 16. In another embodiment, the heat exchanger is mechanically attached to the sediment conveyor 16 through the use of mechanical latches, bars, bolts, clamps, hooks, fasteners or the like.

Since the heat exchanger 18 is constantly frictionally or mechanically coupled to the sediment conveyor 16, the heat exchanger 18 moves with the sediment conveyor 16 as the hood 8 is raised and lowered from an operative position to an inoperative position, or vice versa. In this manner, as the hood 8 is raised toward the inoperative position, the submerging conveyor 12 and the main conveyor 14 may be removed from the bath, while the sediment conveyor 16, along with the constantly attached heat exchanger 18 remain in the bath such that the bath continues to be heated by the heat exchanger 18. Movement of the heat exchanger 18 is always dependent on movement of the sediment conveyor 16, main conveyor 14, submerging conveyor 12 and hood 8. No insertion or removal of pins or other securing device is necessary for the sediment conveyor 16 and heat exchanger 18 to remain in the bath while the main conveyor 14 and submerging conveyor 12 are removed. Moreover, in one embodiment, the PLC controls include safety interlock temperature controls that prevent the hood 8 from being raised to a position that would remove the sediment conveyor 16 and heat exchanger 18 from the bath until the heat exchanger 18 has cooled to a safe temperature. Accordingly, with the constant connection of the heat exchanger 18 to the sediment conveyor 16, and with the permanent successive coupling between the hood 8, submerging conveyor 12, main conveyor 14 and submerging conveyor 16, along with the absence of pins or other securing means that may allow selective locking between the components of the conveyor system 10 and heat exchanger 18, and the PLC safety interlock temperature controls, it is ensured that the heat exchanger 18 will not come out of the bath at full temperature (e.g. a dangerous 550-600° F.). Additionally, when the main conveyor 14 and sediment conveyor 12 are removed from the bath, but the sediment conveyor 16 and heat exchanger 18 remain in the bath, the continued operation of sediment conveyor 16 will prevent sediment build-up on the heat exchanger 18, thereby decreasing the risk of scorching the cooking fluid.

Figure 6:
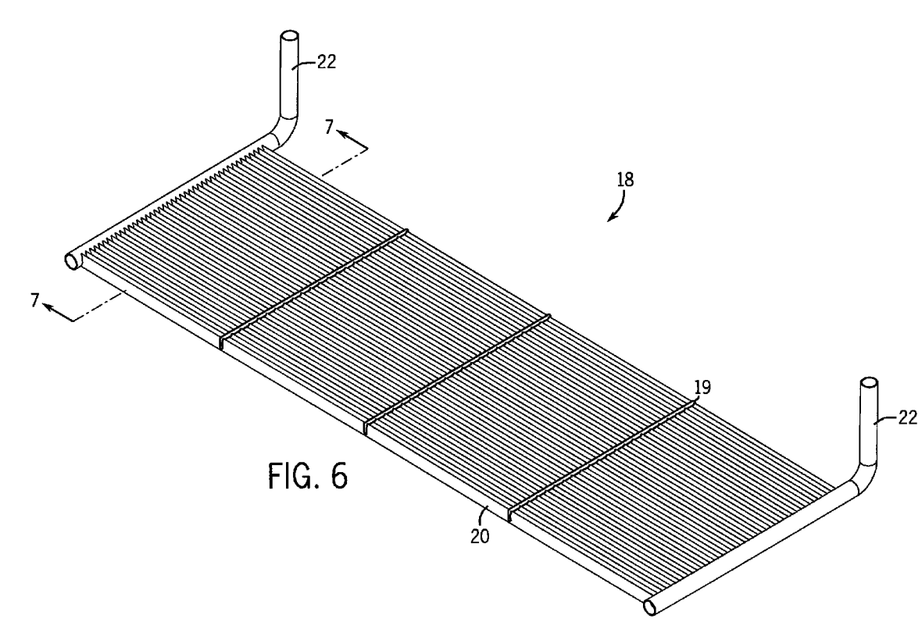
FIG. 6 is a perspective view of a heat exchanger described in the present application.
Figure 7:
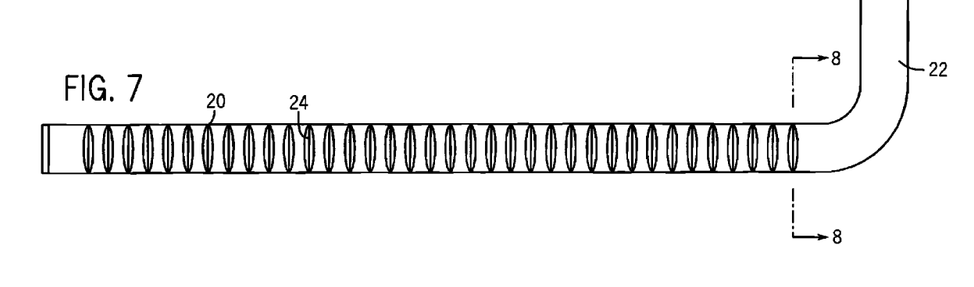
FIG. 7 is a section view of the heat exchanger taken along line 7-7 of FIG. 6 demonstrating the plurality of elliptical shaped conduits of the heat exchanger assembly.
Figure 8:
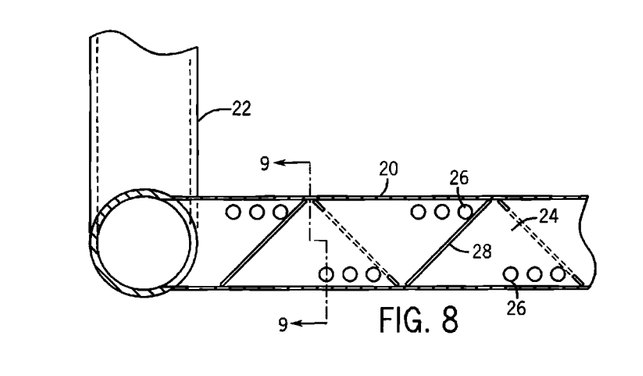
FIG. 8 is a section view taken along line 8-8 of FIG. 7 demonstrating a baffle structure present in the elliptical shape conduit channel of the heat exchanger assembly.
Figure 9:
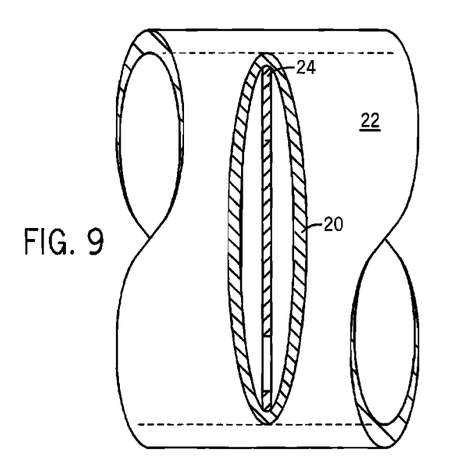
FIG. 9 is a section view taken along line 9-9 of FIG. 8 demonstrating the elliptical shaped conduit attached to a manifold.
Figure 10:
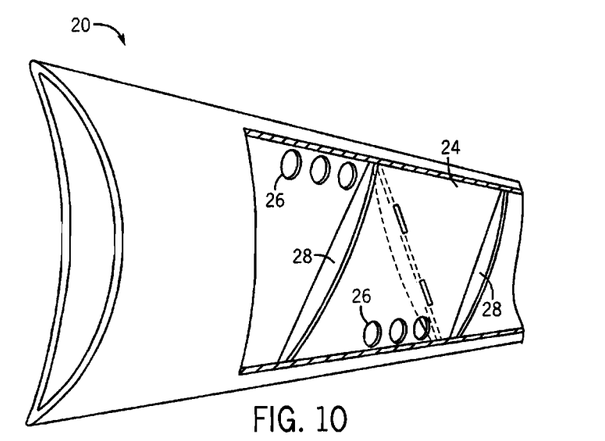
FIG. 10 is a perspective view of the elliptical shaped conduit with a cut-out demonstrating a baffle operating as a fluid flow optimization member.

Referring now to FIGS. 6-10, heat exchanger 18 is adapted for submergence in the bath of hot cooking oil or the like. Both the conveyor system 10 and heat exchanger 18 have a low-profile construction allowing operation at a lower oil volume than conventional frying systems. Heat exchanger 18 includes a plurality of elliptical shaped substantially tubular heating conduits 20 mounted to the sediment conveyor 16. The elliptical heating conduits 20 operate as heating members and may be oriented in the direction of product flow. Each elliptical shaped heating conduit 20 has an inlet end attached to an inlet manifold and an outlet end attached to an outlet manifold for circulating heated fluid through the heat exchanger 18 to accomplish heating of the bath. FIG. 6 does not distinguish between an inlet manifold or outlet manifold, since either manifold 22 may be constructed to operate as the inlet or outlet. Elliptical conduits 20 are seamless, formed substantially tubular conduits and are welded at the ends to the manifold 22. The minimizing of welds on the conduit 20 avoids warping due to the constant stress of thermal expansion and contraction. Thus, concerns involved with conventional heat exchangers, which include numerous welds are avoided. The elliptical shaped conduits have a major axis in the vertical orientation and minor axis in the horizontal orientation providing a low profile design allowing for the reduction of cooking oil levels when in use. Additionally, while minimizing thermal oil volume, the elliptical shaped conduit channels provide substantially more thermal fluid contact with the heating surfaces of the channel compared to conventional, non-equivalent, square-shaped ducts or welded plate heat exchanger configurations. Moreover, the elliptical shaped conduits do not collect sediment debris as square-shaped ducts do, and do not include weld pockets which also collect debris and make conventional heat exchangers very difficult to clean and maintain.

As demonstrated in FIG. 6, the heat exchanger 18 may include flow deflectors 19. Flow deflectors 19 provide baffling to slow turbulence of the bath caused by movement of the conveyor system 10. In providing this baffling function, flow deflectors 19 prevent sediment from collecting on or near heat exchanger 18, thus preventing scorching of the cooking fluid. Flow deflectors 19 also function to support the elliptically shaped conduits 20 such that the conduits 20 are kept uniform along the length of heat exchanger 18.

As shown in FIGS. 7-10, the plurality of elliptical shaped conduit channels 20 each comprise a baffle 24 for re-directing the flow of heating fluid as it passes through the elliptical shaped conduit channel 20 from one manifold 22 to the opposite manifold 22'. In one embodiment, the baffle 24 operates as a fluid flow optimization member to re-direct the flow of heating fluid. The redirection of fluid creates turbulence in the heating fluid, and such redirection may be in a helical path. To accomplish the re-direction of heating fluid, the baffle 24 comprises an elongated insert running longitudinally through the elliptical shaped conduit channel 20. The baffle 24 may longitudinally bisect the elliptical conduit channel 20 or may be otherwise longitudinally arranged in the conduit channel 20. In one embodiment, the baffle 24 further comprises a plurality of turbulence inducing orifices 26 and/or a plurality of vanes 28. The orifices 26 and vanes 28 assist in re-directing the flow of fluid. The orifices 26 and vanes 28 can redirect the fluid into a helical path and operate to create an internal swept surface heat transfer condition within the elliptical conduit channel 20. The configuration of the orifices 26 and vanes 28 may be changed at design to manipulate cooking fluid temperatures at different zones in the fryer. The internal swept surface heat transfer condition essentially allows substantially 100% thermal fluid contact surface within the conduit 20 providing high volume, low pressure fluid flow and delivering balanced heat side to side from in-feed to discharge of the heat exchanger 18. Thus, the elliptical shaped conduits 20 of the present application reduce the residual amount of heating fluid to minimum through this efficient design allowing nearly 100% thermal fluid contact.

In one embodiment, heat exchanger 18 provides constant temperature along the length of the 10-40 foot tank. The heat exchanger allows for the cooking of approximately 10,000 pounds of product per hour, while heating of the product to around 120° F., on average. The heat exchanger 18 is capable of producing at least 550,000 BTU per hour. The circulated heated fluid that runs through heat exchanger 18 is heated, in one embodiment, between 500°-550° F., with an average operating temperature of 510°. However, all of the specifications noted above may be adjusted to suit the particular working temperatures needed for a desired product. In one embodiment, the heat exchanger 18 is operable to heat the oil bath from 75° F. to 400° F. in approximately 20-25 minutes. In another embodiment, the oil is heated to a 415° F. maximum temperature for cooking although, again, these temperatures may be adjusted depending on the particular product being cooked. In one embodiment, the oil is partially hydrogenated soybean oil, although many various alternatives may be used including, but not limited to, sunflower oil, canola oil, peanut oil, lard, vegetable oil, or the like.

Experimental Results

Performance of the heat exchanger described in the present application was compared to an industry standard unit sold by FMC Technologies, Inc. of Sandusky, Ohio, having welded plates or sheets of metal as heat exchangers. Specifically, the ability of the heat exchanger of the present application to provide heat transfer and produce even surface temperature compared to the prior art FMC heat exchanger was examined.

The heat exchanger of the present application and the FMC heat exchanger were placed in a bath of cold water measuring 79 inches by 47 inches by 8½ inches, holding approximately 1,100 lbs. of water. Although the thermal conductivity of water is greater than oil, it provides a means for relative comparison for the efficiency of heat transfer by heat exchangers. The outlet of a 20 HP Gould pump was connected to a 2 inch Cox turbine flow meter. A Mitsubishi Freqrol A100 inverter controlled the pump. After traveling through the flow meter, the water was fed into a 250,000 BTU (input) MiniMax High Performance water heater. The outlet of the water heated fed directly into the heat exchanger under test, to provide the heating fluid, and then back to the pump. A setup also simulated a moving conveyor belt above the heat exchangers. The simulated moving conveyor belt system was made of two equally spaced tubes placed above the heat exchanger that had a 0.200 inch diameter holes drilled 3 inches apart and aligned with the heat exchanger. These small jets moved the cooled water in a fashion similar to a conveyor belt moving at 60 ft/min. This subsystem used a separate 2 HP pump to circulate the cooling water over the top of the heat exchanger and an Electrical Digital Flow Meter to measure the flow rate. In the conveyor simulation, the valve controlled the flow rate.

Six different thermal tests were conducted on the two different heat exchangers. Also, three different simulated conveyor belts speeds were tested on each heat exchanger. The three flow rates for the simulated conveyor belts speeds were done at 5, 17 and 34 gallons per minute and the data was extrapolated for curve fitting. These flow rates correlated to a conveyor belts moving at various, increased speeds. A Fluke Helios I multi channel thermocouple scanner was used to take the thermal date for all tests. A Panasonic PC notebook running LabView 7 was used to record the data. An array of nine thermocouples soldered to the tops of the fins onto the conduit of each respective heat exchanger was assembled, with three thermocouples soldered to the inlet side and three soldered in the center portion, and three thermocouples soldered on the outlet side.

For a typical test, the bath was started at 19° C. (68° F.) and the heat exchanger was used to bring the temperature of the bath up to about 43° C. (113° F.). Various temperatures were recorded during the 10 minutes of temperature rise. The bath temperature was subtracted from the heat exchanger temperatures in order to determine the temperature profile. The data subsequently used to determine the heat exchanger temperature vs. distance along two flow directions and to determine the temperature distribution along the plates of the FMC system.

The FMC system also included an extra set of four thermocouples that measured sidewall temperatures of the heat exchanger. The heat exchanger of the present application also had an extra thermocouple that measured the temperature on a side portion of the elliptical conduits. As mentioned, all thermocouples were soldered to the heat exchangers. Subsequently, the thermocouples were covered with insulating tape during testing. The inlet and outlet temperature of each heat exchanger was measured with the thermocouples and with separate digital thermistor sensors. The two different types of thermal measurements were within 0.2° C. of each other, consistently. The turbine meter was used to set the flow rate to 50 gallons per minute via a variable frequency motor drive.

Internal flow of the heat exchanger was measured with a 2 inch Cox turbine flow meter. The inlet and outlet pressures were also recorded with 0-15 psi Ashcroft pressure gauges placed at the inlet and outlet flanges. The pressure difference from the inlet to the outlet was 1 psi or less.

The heat exchanger performance was measured by examining the bath temperature vs. time and expressed in MBTU per hour. The faster the bath warms up, the more effective the heat exchanger. Due to the overall height of the heat exchanger of the present application, the water level was 0.5 inches less than it was for the FMC heat exchanger. This variation in bath heat capacity is taken into consideration in the results of the tests.

The results demonstrated that the prior art FMC heat exchanger transferred approximately 0.18 MBTU per hour at 5 gallons per minute of agitation flow; approximately 0.15 MBTU per hour at 17 gallons per minute of agitation flow; and approximately 0.17 MBTU per hour at 34 gallons per minute of agitation flow. In contrast, the heat exchanger of the present application provided approximately 0.19 MBTU per hour at 5 gallons per minute of agitation flow; nearly 0.2 MBTU per hour at 17 gallons per minute of agitation flow and 0.21 MBTU per hour at 34 gallons per minute of agitation flow.

Accordingly, the heat exchanger of the present application performed with a 9-29% improvement in heat transfer rate at a given temperature differential compared to the prior art FMC design. Some of the plates of the FMC design were measured to be very close to the bath temperature, indicating that such plates were not transferring significant heat to the bath. Additionally, in some instances, the top portion of the plates were starved of fluid, resulting in a low heat transfer rate. The elliptical conduit channels of the present application, by contrast, had much more even temperature distribution, with all conduits running at similar temperatures close to the internal heating fluid temperatures.

Therefore, the heat exchanger of the present application has superior heat transfer and more even surface temperature distribution than prior art plate designs. Additionally, the heat exchanger of the present application eliminates approximately 2400 feet of welds compared to the conventional FMC system. This results in better frying performance with less burning of the cooking oil and faster heat up times.

Accordingly, described above is an apparatus for frying a product. It is apparent to those skilled in the art that the present invention as described herein contains several features, and that variations to the preferred embodiment as disclosed herein may be made which embody only some of the features disclosed herein. In the foregoing description, certain terms have been used for brevity, clearness and understanding. No unnecessary limitations are to be implied therefrom beyond the requirement of the prior art because such terms are used for descriptive purposes and are intended to be broadly construed. The different configurations and systems described herein may be used alone or in combination with other configurations or systems. Various other combinations and modifications and alternatives may also be apparent to those skilled in the art. Such various alternatives and other embodiments are contemplated as being within the scope of the following claims that particularly point out and distinctly claim the subject matter regarding the invention.

What is claimed is:

1. A fryer comprising a housing having a tank for holding a bath of cooking oil, a conveyor system carrying food product through the bath, a drive system driving the conveyor system, a heat exchanger heating the bath, said tank having a bottom surface and left and right sidewalls extending upwardly therefrom on laterally distally opposite sides of said conveyer system therebetween, said tank having an in-feed end and a discharge end, and comprising left and right pocket cut-outs in said left and right sidewalls, respectively, said left and right pocket cut-outs being intermediate said in-feed and discharge ends, and extending laterally outwardly away from said tank, such that said left pocket cut-out extends laterally outwardly away from said left sidewall and receives a portion of said bath of cooking oil therein, and said right pocket cut-out extends laterally outwardly away from said right sidewall and receives another portion of said bath of cooking oil therein.

2. The fryer according to claim 1 wherein said left and right pocket cut-outs are symmetrical and enable symmetrical thermal expansion and contraction of said left and right sidewalls.

3. The fryer according to claim 1 wherein said left and right pocket cut-outs are adjacent said bottom surface of said tank.

4. The fryer according to claim 3 wherein:
said left pocket cut-out extends laterally outwardly from said left sidewall at the junction of said left sidewall and said bottom surface;
said left pocket cut-out extends upwardly from said junction of said left sidewall and said bottom surface;
said right pocket cut-out extends laterally outwardly from said right sidewall at the junction of said right sidewall and said bottom surface;
said right pocket cut-out extends upwardly from said junction of said right sidewall and said bottom surface.

5. The fryer according to claim 1 wherein one or more of said left and right pocket cut-outs also includes a sediment removal port, providing dual functionality in allowing thermal expansion and contraction and in allowing sediment removal.

6. The fryer according to claim 1 wherein the housing has a hood covering the tank, the conveyor system comprises a submerging conveyor, a main conveyor and a sediment conveyor, and comprising a lift mechanism that lifts the hood and the conveyor system upwardly to an inoperative position above the bath, and lowers the hood and conveyor system downwardly to an operative position, wherein the hood, the submerging conveyor, the main conveyor and the sediment conveyor are successively coupled such that when the lift mechanism lifts the conveyor system, the submerging conveyor, the main conveyor, and the sediment conveyor are successively extracted from the bath, wherein the heat exchanger rests on top of the sediment conveyor so as to allow for independent thermal expansion of both the sediment conveyor and the heat exchanger during heating of the bath, wherein the heat exchanger is carried by the sediment conveyor into and out of the bath when the lift mechanism lifts the sediment conveyor into and out of the bath.

7. The fryer according to claim 6 comprising a first sediment removal port that is centrally located with respect to the conveyor system along a bottom surface of the tank; wherein the sediment removal port is cylindrically shaped so as to accommodate said thermal expansion of the tank; and wherein the tank is seamless such that when the seamless tank is subjected to extreme temperatures from heating of the bath, the seamless tank undergoes thermal expansion and the sediment removal port provides a location of said thermal expansion of the seamless tank.

8. The fryer according to claim 7 wherein the tank comprises a sloped bottom portion leading towards the first sediment removal port.

9. The fryer according to claim 8 comprising a second sediment removal port, wherein the sloped bottom portion comprises a first slope running upwardly away from the first sediment removal port to the second sediment removal port, and a second slope running upwardly away from the second sediment removal port towards a discharge end of the tank.

10. The fryer according to claim 9 comprising at least two sediment removal augers that are integral to the sediment conveyor, one of said at least two sediment removal augers disposed at each of the first and second sediment removal ports, the first and second sediment removal ports being the only holes or cut-outs present in the tank.

11. The fryer according to claim 10 comprising at least one sediment removal belt that is integral with the sediment conveyor.

12. The fryer according to claim 11 wherein the sediment removal belt drags along the sloped bottom portion of the tank to move sediment towards the first and second sediment removal ports.

13. The fryer according to claim 6 comprising a programmable logic controller that is programmed so that the lift mechanism does not lift the conveyor system upwardly to a position wherein the heat exchanger is out of the bath unless the heat exchanger is below a predetermined safe temperature.

14. The fryer according to claim 13 wherein the controller operates the sediment conveyor at a slower speed than the main conveyor.

15. The fryer according to claim 1 wherein the heat exchanger comprises a plurality of elliptical-shaped heating conduits extending in the direction of product flow through the bath, each conduit being disposed in the tank such that the respective conduit has a major axis disposed vertically with respect to the direction of product flow and has a minor axis disposed horizontally with respect to the direction of product flow, wherein each conduit has an inlet end coupled to an inlet manifold and an outlet end coupled to an outlet manifold for circulating heated liquid through the heat exchanger to heat the bath, and comprising a baffle disposed in each conduit and redirecting the flow of liquid therethrough, the baffle comprising an elongated insert that is vertically disposed in the conduit and extends in the direction of product flow, the baffle further comprising a plurality of vanes that extend perpendicularly radially outwardly from the insert and are angled with respect to the major axis, and the baffle further comprising a plurality of orifices in the insert between each vane in the plurality of vanes, wherein the baffle is configured to redirect fluid flow into a helical path as it passes through the respective conduit to thereby achieve an internal swept surface heat transfer condition of fluid flow.

16. The fryer according to claim 15 wherein the heat exchanger further comprises a plurality of flow deflectors, the plurality of flow defectors extending horizontally with respect to the direction of product flow so as to slow turbulence of the bath caused by conveyor system movement.

17. The fryer according to claim 15 wherein each conduit comprises a seamless, formed channel devoid of longitudinal welds.

18. The fryer according to claim 15 wherein the plurality of vanes includes a first group of vanes that extend at a first angle with respect to the major axis and a second group of vanes that extend at a second, different angle with respect to the minor axis.

19. The fryer according to claim 18 wherein the first angle is equal and opposite of the second angle with respect to the major axis.

20. The fryer according to claim 19 wherein the first group of vanes extend perpendicularly outwardly from only a first side of the elongated insert and wherein the second group of vanes extend perpendicularly outwardly from only a second, opposite side of the elongated circuit.

21. The fryer according to claim 19 wherein the plurality of orifices comprises a first group of orifices located adjacent a vertically lower end of the first group of vanes and a second group of orifices located adjacent a vertically upper end of the second group of vanes.

22. The fryer according to claim 21 wherein the first group of orifices includes three orifices and wherein the second group of orifices includes three orifices.

23. The fryer according to claim 21 wherein the plurality of orifices is circular.

24. The fryer according to claim 15 wherein vanes in the plurality of vanes are angled differently with respect to other vanes in the plurality of vanes to thereby differently affect temperature of fluid flow though the heat exchanger along the conduits.

25. The fryer according to claim 15 wherein the elongated insert bisects the conduit.

* * * * *